(12) United States Patent
Yokose (10) Patent No.: US 10,922,847 B2
(45) Date of Patent: Feb. 16, 2021

(54) ENCODING APPARATUS, DECODING APPARATUS, AND NON-TRANSITORY COMPUTER READABLE MEDIUM STORING PROGRAM

(71) Applicant: FUJI XEROX CO., LTD., Tokyo (JP)

(72) Inventor: Taro Yokose, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 192 days.

(21) Appl. No.: 16/043,172

(22) Filed: Jul. 24, 2018

(65) Prior Publication Data
US 2019/0318506 A1 Oct. 17, 2019

(30) Foreign Application Priority Data
Apr. 12, 2018 (JP) .................. 2018-076528

(51) Int. Cl.
G06T 9/00 (2006.01)
G06T 17/00 (2006.01)
(52) U.S. Cl.
CPC .............. G06T 9/00 (2013.01); G06T 17/00 (2013.01); G06T 2200/04 (2013.01)
(58) Field of Classification Search
None
See application file for complete search history.

(56) References Cited

U.S. PATENT DOCUMENTS

| | | | |
|---|---|---|---|
| 5,828,789 A | 10/1998 | Yokose et al. | |
| 6,636,642 B1* | 10/2003 | Yokose | G06T 9/004 341/63 |
| 2002/0008335 A1* | 1/2002 | Leyden | B33Y 30/00 264/494 |
| 2012/0075302 A1* | 3/2012 | Cai | G06T 9/001 345/420 |
| 2013/0002816 A1* | 1/2013 | Hannuksela | G06T 9/00 348/43 |
| 2014/0184430 A1* | 7/2014 | Jiang | G06T 17/005 341/55 |
| 2014/0185668 A1* | 7/2014 | Jiang | G06T 9/40 375/240.08 |
| 2015/0003707 A1* | 1/2015 | Amon | G06T 11/003 382/131 |

(Continued)

FOREIGN PATENT DOCUMENTS

| | | |
|---|---|---|
| JP | 2888186 | 5/1999 |
| JP | 3885413 | 2/2007 |
| JP | 2007166492 | 6/2007 |

OTHER PUBLICATIONS

Predictive Point-Cloud Compression to Gumhold et al. Aug. 2015.*

(Continued)

*Primary Examiner* — Delomia L Gilliard
(74) *Attorney, Agent, or Firm* — JCIPRNET (57) ABSTRACT

An encoding apparatus includes an encoding unit that encodes voxel data representing a solid to be modeled, and among a plurality of prediction sections which predict a value of a voxel of interest based on values of one or more reference voxels around the voxel of interest, determines codes, based on a prediction section which makes a correct prediction about the value of the voxel of interest; a unit that acquires a modeling direction; and a control section that controls the encoding unit based on the modeling direction.

20 Claims, 8 Drawing Sheets

(56) References Cited

U.S. PATENT DOCUMENTS

| | | | |
|---|---|---|---|
| 2015/0078456 A1* | 3/2015 | Hannuksela | H04N 19/44 |
| | | | 375/240.25 |
| 2015/0145966 A1* | 5/2015 | Krieger | G06T 17/20 |
| | | | 348/47 |
| 2015/0245041 A1* | 8/2015 | Ichigaya | H04N 19/44 |
| | | | 375/240.02 |
| 2015/0350678 A1* | 12/2015 | Shimizu | H04N 19/523 |
| | | | 375/240.16 |
| 2017/0214943 A1* | 7/2017 | Cohen | H04N 19/184 |
| 2018/0240241 A1* | 8/2018 | Armstrong | G06T 7/521 |
| 2018/0332279 A1* | 11/2018 | Kang | H04N 19/176 |
| 2019/0179021 A1* | 6/2019 | Wang | G06K 9/6256 |
| 2020/0059642 A1* | 2/2020 | Kang | H04N 19/105 |

OTHER PUBLICATIONS

Compact Encoding of 3-D Voxel Surfaces Based on Pattern Code Representation to Kim et al. Aug. 2002.*

Takashi et al., "Next-generation 3D print data format "FAV" that realizes worldclass expressiveness," Fuji Xerox Technical Report, No. 26, 2017, retrieved on Jan. 26, 2018, pp. 50-56, available at: https://www.fujixerox.co.jp/company/technical/tr/2017/pdf/s 07.pdf.

* cited by examiner

ENCODING APPARATUS, DECODING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-076528 filed Apr. 12, 2018.

BACKGROUND

(i) Technical Field

The present invention relates to an encoding apparatus, a decoding apparatus, and a non-transitory computer readable medium storing a program.

(ii) Related Art

Three-dimensional modeling apparatuses such as three-dimensional (3D) printers (three-dimensional press) are spreading. As a data format for a 3D printer, a format in which a three-dimensional shape is described by a mesh representation of a polygon, such as standard triangulated language (STL) format or 3DS format, is widely used.

In addition, the applicant has proposed a data format of "FAV" which describes the model of a solid to be modeled with a 3D printer by voxel expression (Tomoya Takahashi, Masahiko Fujii, "Next-generation 3D print data format "FAV" that realizes world-class expressiveness", [online], Fuji Xerox Technical Report, No. 26, 2017, [Searched on January 26, Heisei 30], the InternetURL:https://www.fujixerox.co.jp/company/technical/tr/2017/pdf/s_07.pdf). In the FAV format, various properties other than a three-dimensional shape can be expressed by making voxels have various attributes such as color, material, and link strength with other voxels.

As can be inferred from the fact that the data amount of bitmap representation of a two-dimensional full-color image is enormous, voxel type data (referred to as voxel data) representing a solid has an enormous data amount, in particular, in a case where the voxel is given various attributes such as color. An encoding method capable of reducing the data amount of voxel data is required.

As encoding methods for reducing the data amount of a two-dimensional image, JP2007-166492A, JP2888186B, and JP3885413B are disclosed.

An image processing apparatus disclosed in JP2007-166492A extracts encoding information in an original encoding process when decoding input code data, estimates encoding efficiency after an image process, based on contents of the image process applied to decoded image data and extracted encoding information, and performs code amount control for the image data after the image process, using the estimated encoding efficiency. Thus, code amount control can be realized by one pass.

In an encoding apparatus disclosed in JP2888186B, when one of prediction results of a pixel value prediction section matches a pixel of interest, an encoding section encodes an identifier of the matching pixel value prediction section. When they do not match, the encoding section encodes the prediction error of a prediction error calculation section. A decoding apparatus decodes a code into the identifier or a prediction error, outputs pixel data from the corresponding pixel value prediction section based on the identifier and takes out pixel data from a prediction error adding section, based on the prediction error.

In an encoding apparatus disclosed in JP3885413B, a first prediction section and a second prediction section predict a pixel value of a pixel of interest, based on image data, by a predetermined method to generate predicted value data. A run counting section compares the image data with the predicted value data. In a case where prediction is correct and run continues to the immediately preceding pixel, the run counting section adds 1 to the run count value of the corresponding prediction section. In a case where there is no prediction section which makes a correct prediction and whose run continues to the immediately preceding pixel, the run counting section sends the run continued up to the immediately preceding pixel together with the identification number of the prediction section to a selection section as run data. The selection section alternatively outputs the run value and the identification number, or the prediction error data from the prediction error calculation section, encodes and outputs it.

SUMMARY

Aspects of non-limiting embodiments of the present disclosure relate to an apparatus that predicts and encodes voxel data, which reduces the data amount of codes as compared with a case where a modeling direction in modeling a solid represented by the voxel data is not taken into account.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an encoding apparatus including an encoding section that encodes voxel data representing a solid to be modeled, and among plural prediction sections which predict a value of a voxel of interest based on values of one or more reference voxels around the voxel of interest, determines codes, based on a prediction section which makes a correct prediction about the value of the voxel of interest; a section that acquires a modeling direction; and a control section that controls the encoding section based on the modeling direction.

BRIEF DESCRIPTION OF THE DRAWINGS

Exemplary embodiment(s) of the present invention will be described in detail based on the following figures, wherein.

DETAILED DESCRIPTION

An encoding apparatus of the present exemplary embodiment is an apparatus which encodes voxel data for three-dimensional modeling.

The voxel data is, for example, data defining a solid to be modeled in a three-dimensional modeling apparatus by a group of voxels. A voxel is an element that is a constituent unit of a solid, and is accommodated in each small space of dice that can be formed by dividing a three-dimensional space containing the shape of the solid into a lattice shape with equally-spaced straight lines parallel to the x, y, and z coordinate axes. This small space is hereinafter referred to as a lattice position or a cell. The small space is a cubic shape, and in a typical example, the voxel is a cubic shaped element that occupies the entire small space, but the shape of the voxel is not limited to this. Individual voxels have one or more attributes such as color, material, and strength of relationship with adjacent voxels (representing strength of the bond, for example). In the lattice positions in the space, there are a lattice position where there are voxels constituting a solid and a lattice position where there is no such voxel. For each lattice position, voxel data includes information indicating the presence or absence of a voxel at the lattice position and information indicating the value of one or more attributes of the voxel with respect to the lattice position where there is a voxel. The FAV format shown in Tomoya Takahashi, Masahiko Fujii, "Next-generation 3D print data format "FAV" that realizes world-class expressiveness", [online], Fuji Xerox Technical Report, No. 26, 2017, [Searched on January 26, Heisei 30], the Internet<URL:https://www.fujixerox.co.jp/company/technical/tr/2017/pdf/s_07.pdf> is an example of a data format capable of expressing such voxel data.

In the present exemplary embodiment, encoding efficiency is improved by taking the modeling direction into consideration in encoding voxel data.

The modeling direction is a direction in which modeling proceeds in a case where a modeling apparatus such as a 3D printer models a shape of a solid represented by voxel data, that is, a direction in which a modeled solid grows.

An important direction among some certain modeling directions is the direction in which layers of shapes to be modeled grow. This direction is referred to as the stacking direction. There are various types of modeling methods used by the existing 3D printers such as a stereolithography, a powder method, a heat melt stacking method (FDM method), an inkjet method, and a sheet stacking method, but all of them are a method of stacking layers of shapes. In general modeling under gravity, the stacking direction is upward in the vertical direction.

Further, as another modeling direction, there is a direction in which modeling proceeds in the layer. This is called an in-layer modeling direction. For example, the direction in which the head ejecting the modeling material moves in the layer (horizontal plane) in the case of the inkjet method, the scanning direction of the laser beam in the layer in the case where the laser beam is radiated in the stereolithography and the powder method, and the direction in which the nozzle extruding the molten resin moves in the layer in the FDM method correspond to the in-layer modeling direction.

From the process of various 3D modeling methods, it is considered that the attribute values (for example, color and material) of voxels have continuity in the modeling direction, that is, the attribute values of voxels are highly correlated with each other in the modeling direction. Therefore, in the present exemplary embodiment, predictive encoding depending on the modeling direction is performed at the time of encoding the voxel.

In other words, in the encoding according to the present exemplary embodiment, among voxels (referred to as reference voxels) to be referred to at the time of predictive encoding of a voxel to be encoded (referred to as a voxel of interest), voxels in the modeling direction with respect to the voxel of interest are handled preferentially over voxels that are not. In the following description, the reference voxel in the modeling direction with respect to the voxel of interest is referred to as "modeling direction voxel".

For example, in a system that encodes the identification information of the prediction section that makes a correct prediction, among plural prediction sections that predict the value of the voxel of interest by using one or more of the reference voxels, as information indicating the value of the voxel of interest, a code corresponding to the identification information of the prediction section is allocated in a form giving priority to modeling direction voxels. In other words, in a case where there is plural prediction sections having "the same condition excluding the degree of contribution of the modeling direction voxel", among the plural prediction sections, shorter codes are allocated to prediction sections having higher "degree of contribution of modeling direction voxels".

Here, "the same condition excluding the degree of contribution of the modeling direction voxel" means, for example, that the distance between the voxel of interest and the reference voxel appearing in the prediction expression used by the prediction section for prediction is the same among the plural prediction sections, and that the prediction expression is isomorphic among the plural prediction sections. For example, it is assumed that there are five reference voxels A, B, C, D, E for the voxel X of interest and the distance between the reference voxels A, B, C and the voxel X of interest is 1 (that is, adjacent to the voxel X of interest) and the distance between the reference voxels D, E and the voxel X of interest is 2. Among them, the reference voxel A is a modeling direction voxel, and the rest are not the modeling direction voxels. Hereinafter, in order to simplify the notation, it is assumed that the predicted value of the voxel X of interest calculated by the prediction section is X and the value of the reference voxel Y (Y is any one of A to E) used for calculating the predicted value is Y. In this example, in a case where there are a prediction section α that predicts X=A, a prediction section β that predicts X=B, and a prediction section δ that predicts X=D, in the prediction sections α and β, the forms of the prediction expressions are the same and the distances between the reference voxels used and the voxel X of interest are the same except for the distinction of the reference voxels used, so it corresponds to "the same condition excluding the degree of contribution of the modeling direction voxel". In contrast, in the prediction sections α and δ, the forms of the prediction expressions are the same but the distances between the reference voxels A and D used and the voxel X of interest are different, so it does not correspond to "the same condition excluding the degree of contribution of the modeling direction voxel". In the prediction section μ that predicts X=(2A+D)/3 and the prediction section ν that predicts X=(2B+E)/3, the forms of the prediction expressions are the same and the distances between the reference voxels used and the voxel X of interest are the same except for the distinction of the reference voxels used, so it corresponds to "the same condition excluding the degree of contribution of the modeling direction voxel".

The "degree of contribution of modeling direction voxels" is the degree of contribution of modeling direction voxels to the predicted value predicted by the prediction section. For example, the proportion occupied by modeling direction voxels in the prediction expression used by the prediction section is an example of the degree of contribution. For example, the degree of contribution of the modeling direction voxel for the prediction section $\alpha$ (X=A. A is the value of the modeling direction voxel) is 1 (that is, 100%), and the degree of contribution of the modeling direction voxel for the prediction section $\beta$ is 0. Further, the degree of contribution of the modeling direction voxel for the prediction section $\mu$ that predicts X=(2A+D)/3 is ⅔ (66%), and the degree of contribution of the modeling direction voxel for the prediction section $\nu$ that predicts X=(2B+E)/3 is 0.

For example, a method is considered in which plural prediction sections are ranked, and shorter codes are allocated to prediction sections having higher rankings. In this method, in a case where there is plural prediction sections that perform prediction under the same condition in terms of whether or not the reference voxel used for prediction is a modeling direction voxel (for example, the forms of the prediction expressions and the distances between the voxel of interest and the reference voxels used are the same), the prediction section with a higher degree of contribution of the modeling direction voxel has a higher ranking.

Since the correlation between the voxel values is high along the modeling direction, it is considered that the prediction section with a high degree of contribution of modeling direction voxels tends to make a correct prediction. Assigning a shorter code to a prediction section that tends to make a correct prediction reduces the total code amount and improves the encoding efficiency.

In addition, the correlation in the stacking direction among the modeling directions is considered to be higher than the correlation in the in-layer modeling direction. It is based on the following reasons.

In other words, since problems arise such as sagging of a modeled object before it solidifies in which shapes without a vertical support are continuous in the lateral direction, support materials to support such parts are also modeled. However, it costs to model the support materials and it also costs to remove the support material after completing modeling, so it is required to reduce the modeling amount of support materials. Therefore, the modeling direction of the voxel data (in particular, the stacking direction) is often determined according to the standards of reducing the modeling amount of the support material as much as possible. In the case where modeling is performed along the modeling direction (in particular, the stacking direction) determined based on such standards, a probability that there is a voxel constituting a solid immediately below a voxel constituting the solid is higher than a probability that it is a space without a solid, based on the standards of reducing the number of the support material as much as possible. Conversely, there is a high probability that a space immediately below the position of a voxel that does not constitute a solid is a space that also does not constitute a solid. Thus, the correlation between voxels along the stacking direction is considered to be higher than the correlation in the other direction.

Therefore, as one example, among the reference voxels in the modeling direction with respect to the voxel of interest, in particular, the weight of the reference voxel in the stacking direction may be handled as being heavier than the weight of the reference voxel in the in-layer modeling direction. For example, in a case of giving a point to the prediction section based on the point of the reference voxel used by the prediction section for ranking of the prediction section (concrete example will be described later), the point of the reference voxel in the stacking direction with respect to the voxel of interest Is made higher than the point of the reference voxel in the in-layer modeling direction. In addition, the weight of a voxel located immediately below the voxel of interest along the stacking direction may be made heavier than the weight of the voxel located immediately above.

Further, in the present exemplary embodiment, as another method of encoding preferentially handling the modeling direction voxel, in a case where there is plural prediction sections that make a correct prediction about the value of the voxel of interest, and the plural prediction sections satisfy "the same condition excluding the degree of contribution of the modeling direction voxel", the identification information of the prediction section having the highest "degree of contribution of modeling direction voxels" among them is encoded as representing the value of the voxel of interest. Since the prediction section with a higher degree of contribution of the modeling direction voxel tends to make a correct prediction successively, an effect of extending the average run length can be expected in a case of performing run length-based encoding. Further, it is expected that further improvement of encoding efficiency can be achieved by combining with a method of assigning a relatively shorter code as "degree of contribution of modeling direction voxels" is higher.

Thus, the concept of encoding according to the present exemplary embodiment has been exemplified. Next, with reference to FIG. 1, an example of the configuration of the encoding apparatus of the present exemplary embodiment will be described.

The encoding apparatus shown in FIG. 1 includes an encoding control section 10, a coordinate conversion section 12, prediction sections 14-1, 14-2, . . . , 14-N (N is an integer of 2 or more) (hereinafter, they are collectively referred to as "prediction section 14", in a case where it is unnecessary to distinguish them), a prediction error calculation section 16, a selection section 18, an encoding section 20, and an output section 22.

Voxel data to be encoded and information on the modeling direction for the voxel data are input to the encoding apparatus. The information on the modeling direction is expressed in the form of a vector indicating the modeling direction in the coordinate system of the voxel data, for example. Only the stacking direction may be input and the stacking direction and the in-layer modeling direction (for example, main scanning direction) are input as the modeling direction.

In one example, the modeling direction is designated by the user. There is software for determining from information on a three-dimensional shape, an appropriate modeling direction for the shape, and the modeling direction may be determined using the software. In this type of software, for example, the modeling direction is determined such that the modeling amount of the support material is minimized, which supports the solid not to be deformed during modeling.

The encoding control section 10 controls the encoding process based on the input information on the modeling direction. In the example of FIG. 1, in particular, the encoding control section 10 controls the coordinate conversion of the voxel data by the coordinate conversion section 12. In other words, the encoding control section 10 controls the coordinate conversion section 12 to perform coordinate conversion of the voxel data such that the progress direction of encoding for the voxel data coincides with the modeling direction. For example, a case is considered in which in a coordinate system of voxel data, encoding proceeds in a scanning order of raster scanning or scanning along a space filling curve (for example, Peano curve) for each layer perpendicular to the Z axis, the encoding proceeds to the next layer in the positive direction of the Z axis after encoding of one layer is completed. In this case, the coordinate conversion section 12 performs coordinate conversion such that the Z axis coincides with the stacking direction, under the control of the encoding control section 10. More preferably, for example, the coordinate conversion is performed such that the positive direction of the Z axis coincides with the stacking direction (that is, the direction in which the solid to be modeled grows). Further, in the case where the encoding in the layer of the voxel data and the modeling in the layer in the modeling apparatus proceed along the raster scanning path, in addition to the above-described condition relating to the Z axis, the coordinate conversion may be performed such that the axis corresponding to the main scanning direction in the layer out of the X axis and the Y axis coincides with the main scanning direction in the in-layer modeling direction. Even in this case, more preferably, for example, the coordinate conversion is performed such that the main scanning direction of encoding coincides with the main scanning direction in the in-layer modeling direction (that is, the direction in which the solid grows in the layer).

The N prediction sections 14 predict attribute values (for example, colors) of the voxels of interest in the voxel data, from attribute values of one or more reference voxels around the voxel of interest. Respective prediction sections 14 obtain the predicted value of the color of the voxel of interest using different methods. The "different method" referred to herein includes a case where the reference voxels for prediction used by the prediction sections 14 are different or a case where the prediction expressions for predicting the attribute value of the voxel of interest from the attribute values of one or more reference voxels are different.

Figure 2:
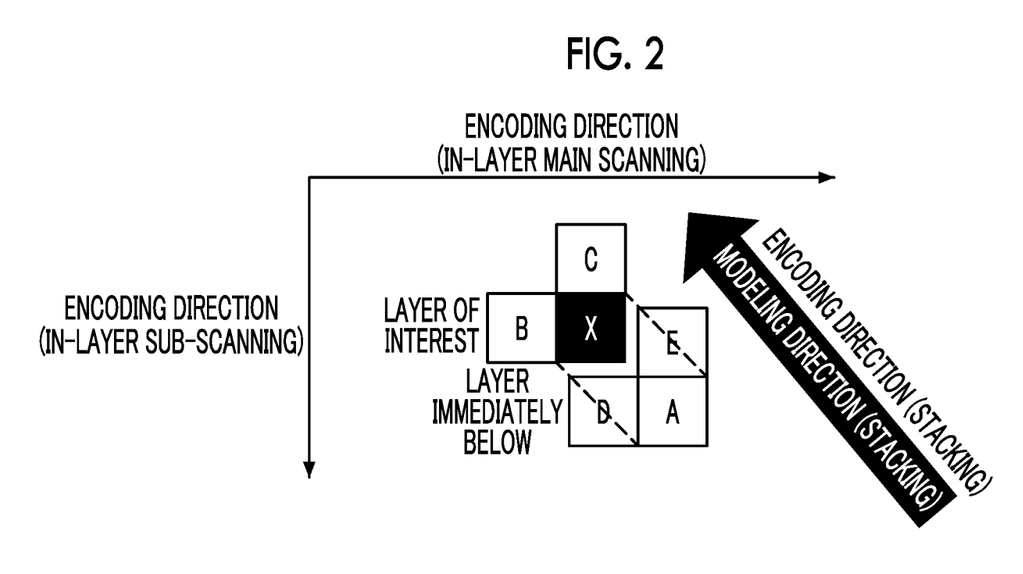
FIG. 2 is a diagram illustrating a relationship between a modeling direction and a reference voxel used for encoding.

In the example shown in FIG. 2, five voxels are used as reference voxels: the voxels B and C immediately before the voxel X of interest in the main scanning direction and the sub-scanning direction of the encoding for the voxel X of interest in the layer of interest, the voxel A immediately below the voxel X of interest in the layer of interest, and the voxels D and E immediately before the voxel X of interest in the main scanning direction and the sub-scanning direction of the encoding in the same layer as that of the voxel A. The order of A, B, C, D and E indicates the ranking of reference voxels. The ranking of the reference voxels is higher, as a distance between the voxel of interest and the reference voxel is closer. Further, in a case where the distances from the voxel of interest are the same, the voxels at the position along the modeling direction with respect to the voxel of interest have a higher ranking than the voxels that are not. Since the example in FIG. 2 is in the coordinate system after the coordinate conversion by the coordinate conversion section 12, the direction in which the encoding proceeds in layer sections coincides with the modeling direction (stacking direction). Therefore, the voxel A in the modeling direction with respect to the voxel X has a higher ranking than the voxels B and C that are not. Further, with respect to the rankings of the reference voxels located at the same distance from the voxel of interest, in the layer, the ranking of the voxel in the main scanning direction for the voxel of interest is higher than that in the sub-scanning direction. In particular, in a case where coordinate conversion is performed such that the main scanning direction of encoding coincides with the main scanning direction of modeling, such ranking is meaningful.

Here, it is assumed that the encoding apparatus includes five prediction sections 14 that perform prediction with reference to the five reference voxels illustrated in FIG. 2, and each prediction section 14 sets the value of the corresponding reference voxel as the predicted value of the voxel X of interest. In this case, in a case where the prediction section 14-1 performs prediction with a prediction expression of X=A, the reference voxel A is the modeling direction voxel, and a distance from the voxel X of interest is the shortest one voxel, so the prediction section 14-1 is associated with the shortest code, and is selected with the highest priority by the selection section 18 in a case where the prediction is correct. Hereinafter, in a case where the prediction sections 14-2, 14-3, 14-4, and 14-5 respectively perform prediction with the prediction expressions of X=B, X=C, X=D, and X=E, short codes are assigned to the prediction sections 14 in order of the rankings of the corresponding reference voxels B, C, D, and E, respectively, and in a case where predictions by the plural prediction sections 14 are correct at the same time, they are preferentially selected in the order of the rankings.

Further, it is assumed that the prediction sections 14 included in the encoding apparatus respectively use prediction expressions of X=A, X=B, X=C, and X=(A+D)/2 in the arrangement example of reference voxels in FIG. 2. For example, by determining the point of the reference voxel based on the distance and direction of the voxel of interest, and obtaining the point of the prediction section 14 from the point of the reference voxel in the prediction expression used by the prediction section 14, the prediction section 14 may be ranked in descending order of the point. For example, in the case of using a scoring rule that four points are given in a case where a distance from the voxel of interest is one voxel, one point is given in a case where a distance is two voxels, three points are given in a case where it is in the stacking direction with respect to the voxel of interest, and one point is given in a case where it is in the main scanning direction of encoding with respect to the voxel of interest, the reference voxel A has seven points, and the reference voxel B has five points, the prediction section 14 that performs prediction with X=A has seven points, and the prediction section 14 that performs prediction with X=B has five points. For example, for the prediction section 14 that uses a prediction expression including division such as X=(A+D)/2, the point determined by dividing the points of the reference voxels in the prediction expression similarly is, for example, four points. The ranking of each prediction section 14 may be determined based on the points determined in this way, and the assignment of code to each prediction section 14 may be performed using the ranking, and the selection in a case where the predictions by the plural prediction sections 14 are correct at the same time may be performed.

In addition, the reference voxels A to E shown in FIG. 2 are only examples. Of course, voxels in the position relationship other than A to E with respect to the voxel X of interest may be used as the reference voxels.

Some examples are shown, but in any of the above methods, in a case where there is plural prediction sections 14 having the same condition (for example, the distance from the voxel X of interest) other than the condition of whether or not it is a modeling direction voxel, ranking is given in descending order of degree of contribution of modeling direction voxels (that is, points due to a modeling direction in the above-described example) among them.

As described above, each prediction section 14 is ranked in advance according to the prediction expression (and the reference voxel used in the expression) used by each prediction section. The information on the ranking is held in the selection section 18. In addition, as the ranking is higher, the encoding section 20 assigns a shorter code to each prediction section 14 according to the ranking.

Each prediction section 14 compares the predicted value calculated by itself with the value of the voxel X of interest. In a case where both coincide with each other, that is, in a case where the prediction is correct, the prediction section 14 sends a signal indicating that the prediction is correct to the selection section 18; and otherwise, it sends a signal indicating that the prediction is incorrect.

The prediction error calculation section 16 calculates a difference between the value of the voxel X of interest predicted by a predetermined method (for example, the same method as a specific prediction section among the prediction sections 14) and the actual value of the voxel of interest, for the case where all the predictions by the N prediction sections 14 are incorrect, and outputs the difference as a prediction error.

Figure 3:
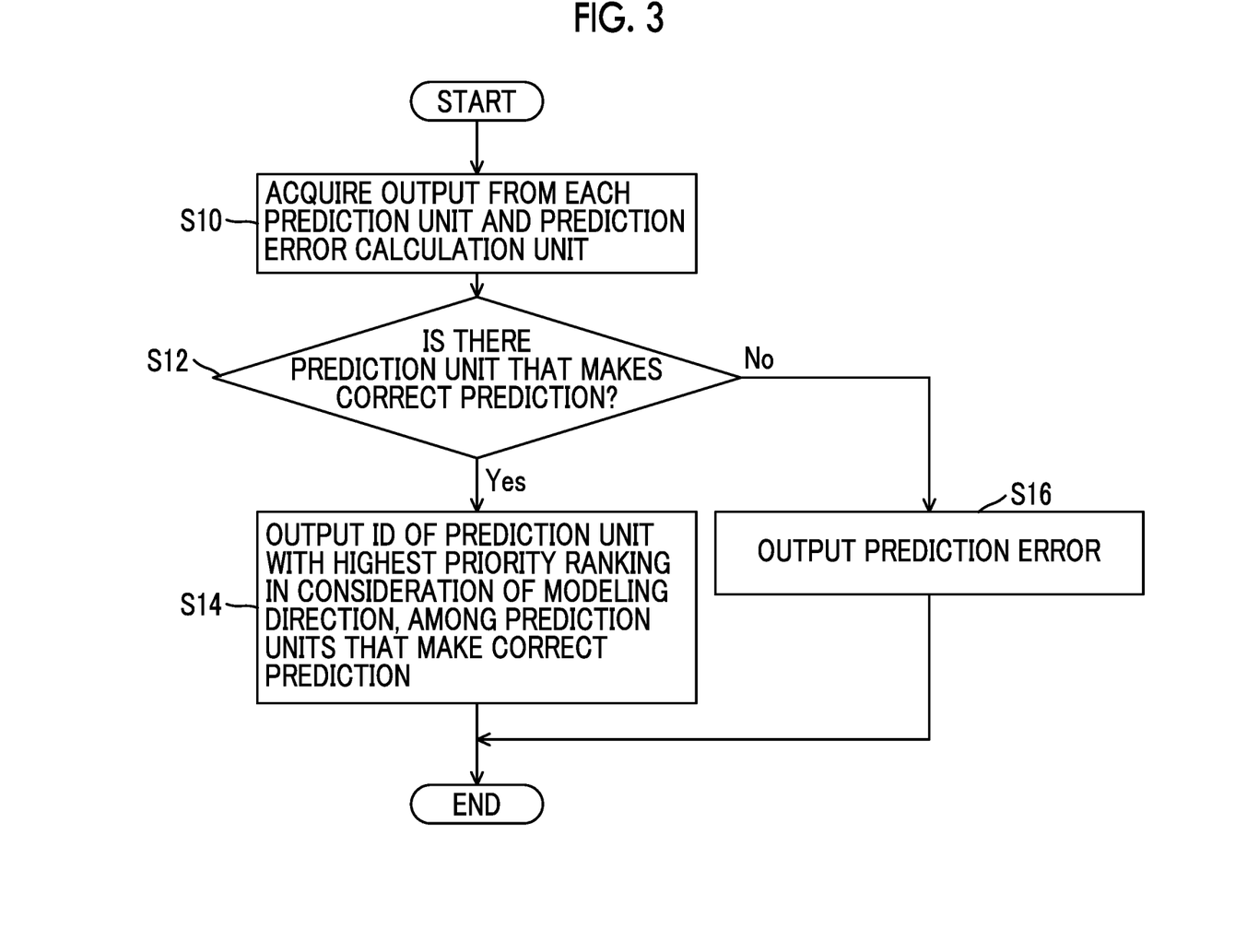
FIG. 3 is a diagram illustrating a processing procedure of a selection section.

The selection section 18 receives information from the N prediction sections 14 and the prediction error calculation section 16, selects one from among them, and sends the selected information to the encoding section 20. An example of the processing procedure of the selection section 18 is shown in FIG. 3.

In this procedure, in a case of receiving the information output from the N prediction sections 14 and the prediction error calculation section 16 (S10), the selection section 18 determines whether or not there is a prediction section 14 that makes a correct prediction based on the information (S12). In the case where there are prediction sections 14 that make a correct prediction (determination result of S12 is Yes), the identification information (ID) of the prediction section 14 with the highest ranking, among the prediction sections 14 that make a correct prediction, is output to the encoding section 20 (S14). In a case where there is one prediction section 14 that makes a correct prediction, the ID of the prediction section 14 is naturally output to the encoding section 20. In a case where the determination result of S12 is No, the selection section 18 outputs the prediction error received from the prediction error calculation section 16 to the encoding section 20 (S16).

The encoding section 20 encodes the information received from the selection section 18. Here, as described above, in the encoding of the ID of the prediction section 14, a shorter code is given to the prediction section 14 having a higher ranking in consideration of the modeling direction. The assignment code is set in advance. In addition, encoding of prediction error is performed by adding a value of prediction error after a code indicating incorrect prediction. The process of the encoding section 20 may be the same as that shown in JP2888186B (see FIG. 4) except for giving a shorter code to the prediction section 14 having a higher ranking in consideration of the modeling direction. The code to be used may be an entropy code such as a Huffman code, but it is not limited thereto.

The output section 22 outputs the code generated by the encoding section 20. In addition, the output section 22 acquires the information on the modeling direction from the encoding control section 10, outputs the information on the modeling direction in association with the code (for example, such as including the modeling direction as attribute information in a file of code data). On the decoding side to be described later, decoded voxel data can be returned to the original coordinate system, if necessary, using information on the modeling direction.

Figure 4:
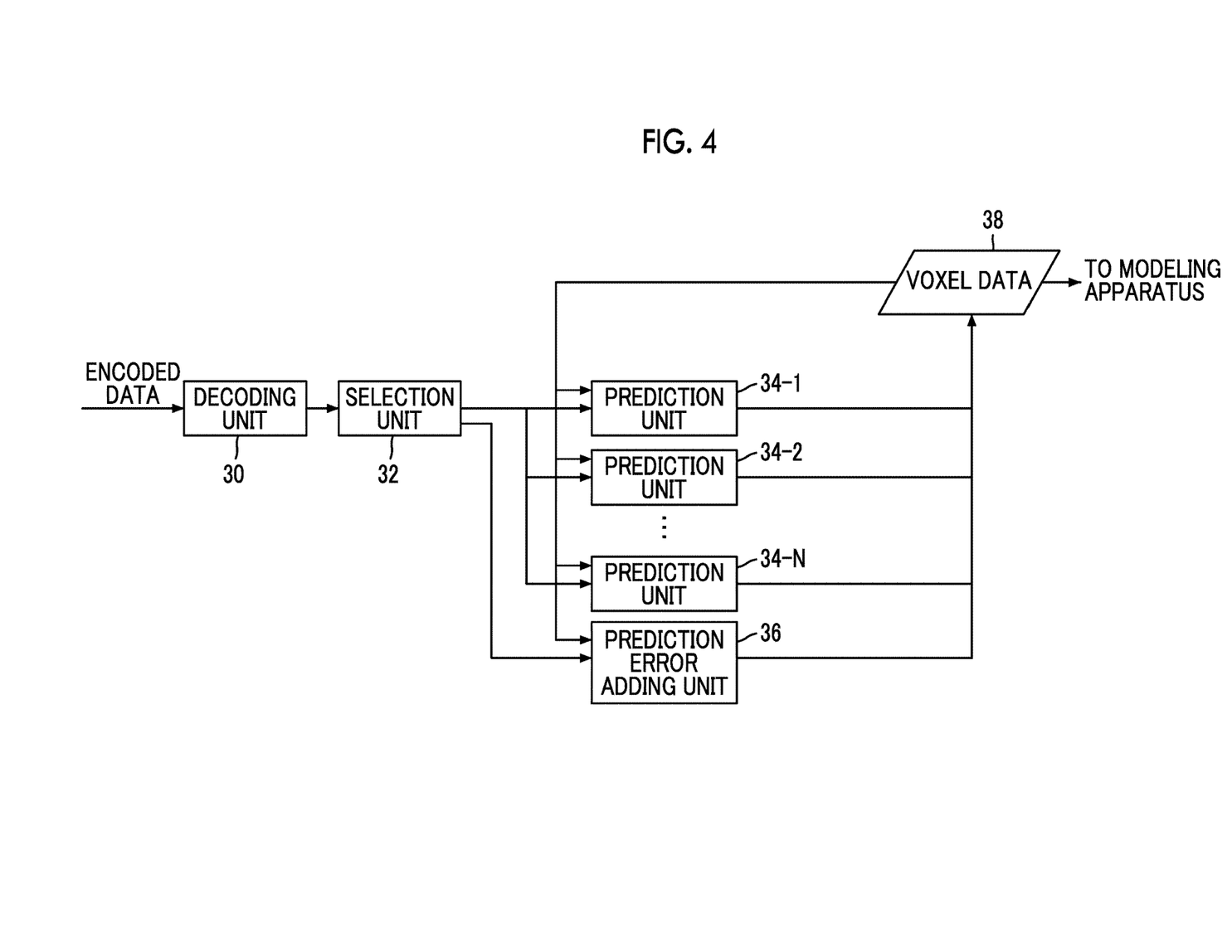
FIG. 4 is a diagram illustrating a functional configuration of a decoding apparatus.

The code data generated in this way can be decoded by executing the reverse process of encoding. FIG. 4 illustrates the configuration of the decoding apparatus.

The prediction sections 34-1, 34-2, ..., 34-N (hereinafter collectively referred to as the prediction section 34) are respectively identified with the same identification information pieces as those of the prediction sections 14-1, 14-2, ..., 14-N of the encoding apparatus, and predicts the value of the voxel of interest in the same method. For example, the prediction section 34-1 has the same identification information as that of the prediction section 14-1 and predicts the value of the voxel of interest with the same prediction expression as that used by the prediction section 14-1.

The decoding section 30 decodes input codes sequentially from the beginning. The value of the decoding result is the identification information of the prediction section 34 or a value indicating incorrect prediction. In the latter case, since the value followed by the code of the prediction error, the decoding section 30 decodes the code.

In a case where the decoding result received from the decoding section 30 is the identification information of the prediction section 34, the selection section 32 sends a prediction instruction to the prediction section 34 corresponding to the identification information. The prediction section 34, which has received the prediction instruction, performs prediction using the decoded reference voxel (a part of the voxel data 38), and writes the value of the prediction result as the value of the voxel of interest in the memory area of the voxel data 38.

In addition, in a case where the decoding result from the decoding section 30 indicates incorrect prediction, the selection section 32 inputs the value of the prediction error which is input subsequently thereto to the prediction error adding section 36. The prediction error adding section 36 predicts the value of the voxel of interest by the same method as that of the prediction error calculation section 16 of the encoding apparatus. Then, a result obtained by adding the input prediction error to the predicted value is written into the memory area of the voxel data 38 as the value of the voxel of interest.

The voxel data 38 decoded by the decoding apparatus in this way is used for the modeling process by the modeling apparatus. Since the decoded voxel data 38 is data in the XYZ coordinate system in which the stacking direction among the modeling directions is the positive direction of the Z axis, in a case where the modeling apparatus is instructed to proceed stacking in the positive direction of the Z axis, the solid represented by the voxel data 38 is modeled.

Next, an example in which the encoding efficiency is further improved by applying the run length encoding to the above-described method will be described with reference to FIGS. 5 to 7.

Figure 1:
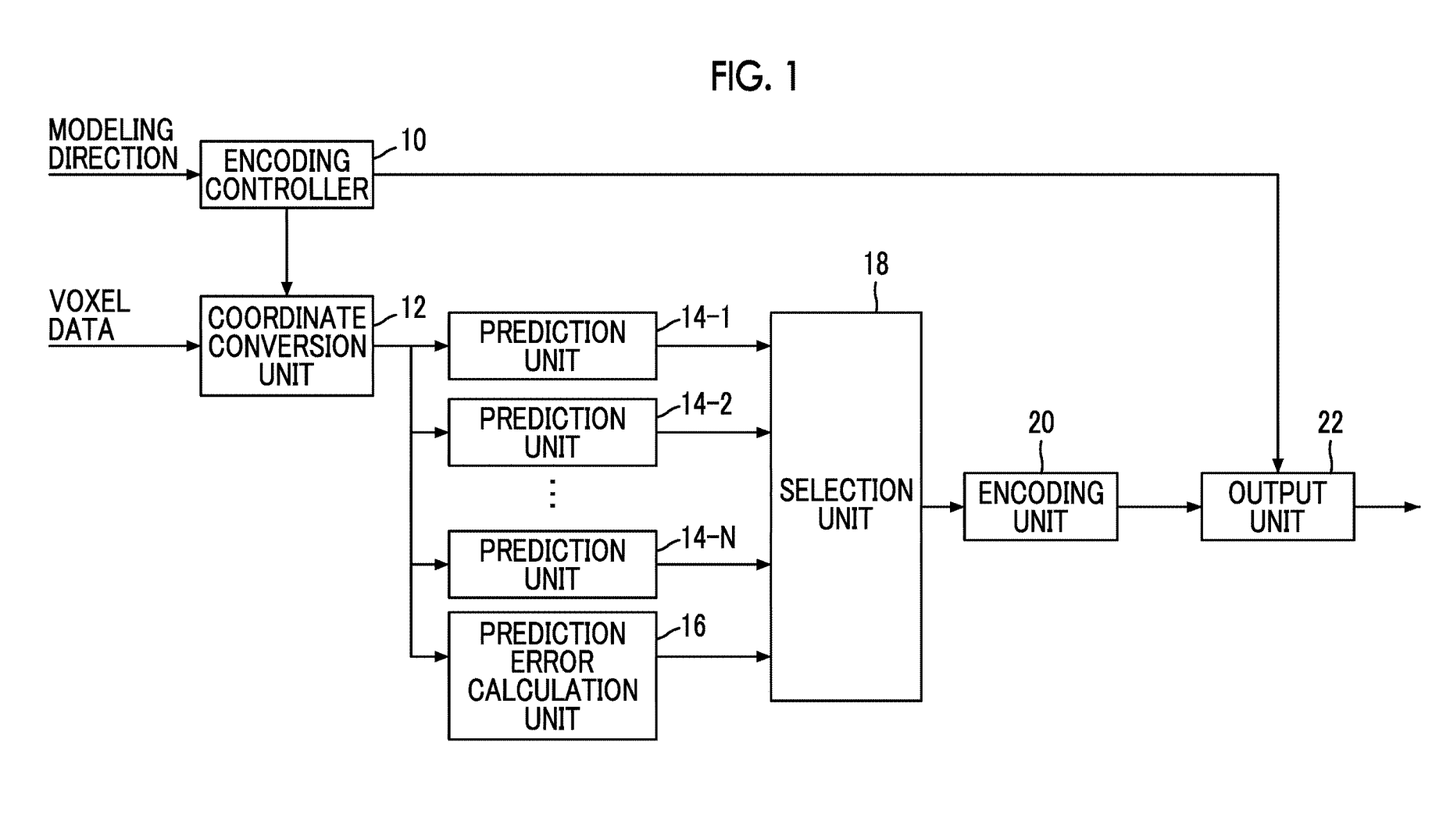
FIG. 1 is a diagram illustrating a functional configuration of an encoding apparatus.
Figure 5:
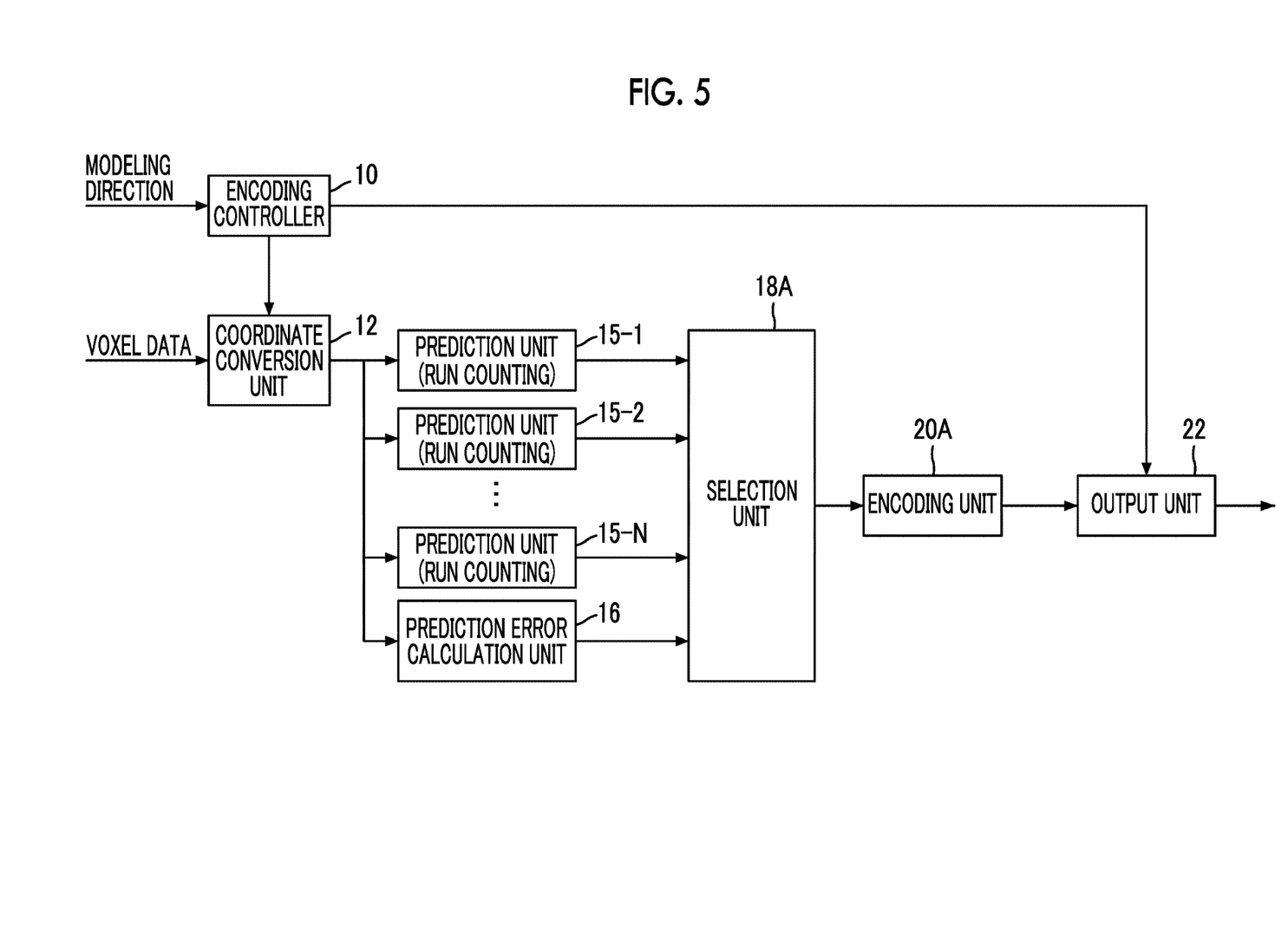
FIG. 5 is a diagram illustrating a functional configuration of an encoding apparatus that also uses a run length method.

In the encoding apparatus shown in FIG. 5, the functions of the encoding control section 10, the coordinate conversion section 12, the prediction error calculation section 16 and the output section 22 may be the same as those of the function modules of the same names in the encoding apparatus of FIG. 1.

In the example of FIG. 5, N prediction sections 15-1, 15-2, . . . , 15-N (collectively referred to as a prediction section 15) predict the value of the voxel of interest by the same method used by the prediction sections 14-1, 14-2, . . . , 14-N in the example of FIG. 1. For example, the prediction section 15-1 predicts the value of the voxel of interest with the same prediction expression as that used by the prediction section 14-1. Further, the prediction section 15 has a function of counting succession (runs) of correct prediction, and in a case where the run is interrupted (that is, in a case where prediction is missed), the run length counted so far is output to the selection section 18A.

Figure 6:
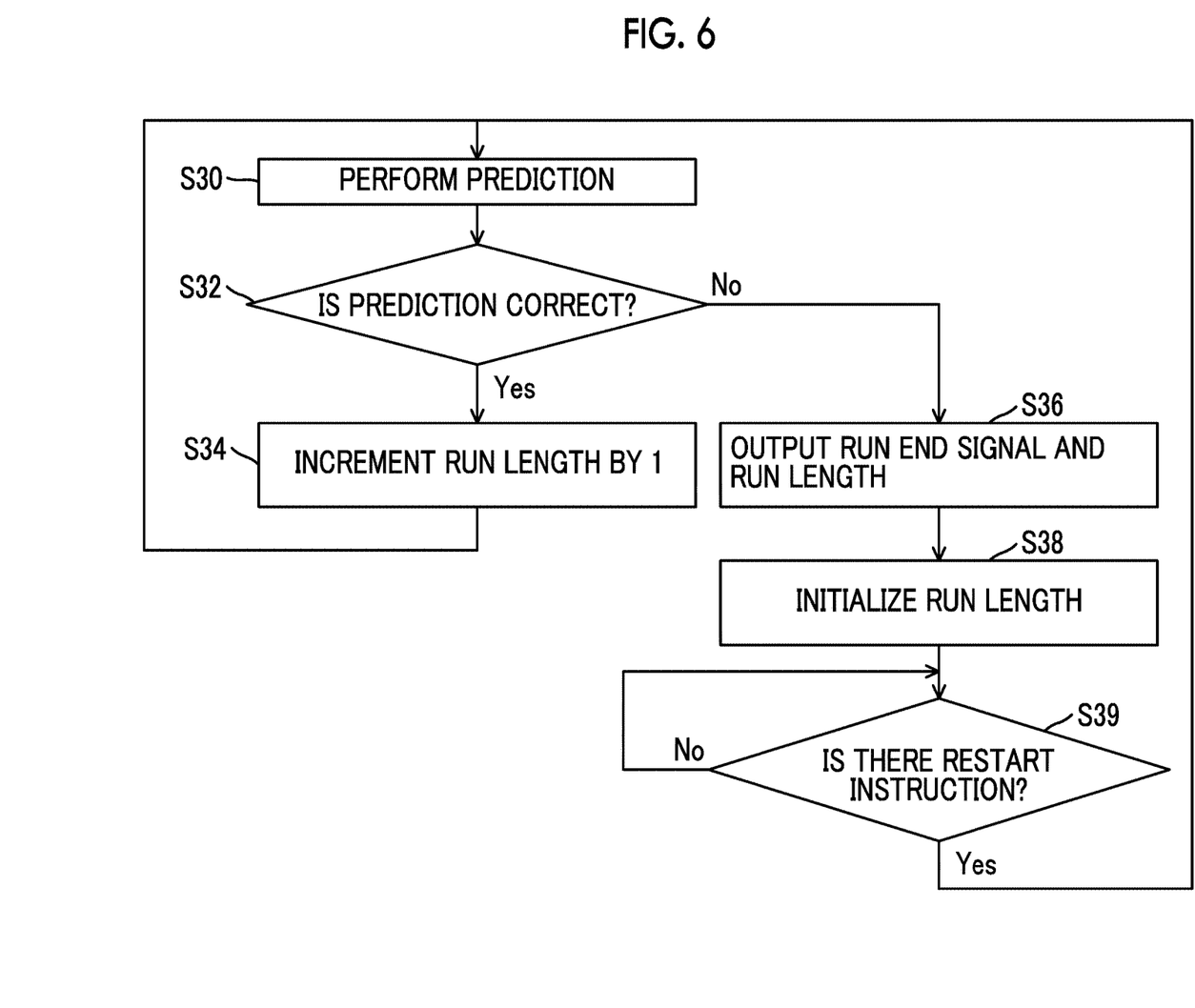
FIG. 6 is a diagram illustrating a processing procedure of a prediction section of the apparatus of FIG. 5.

FIG. 6 exemplifies the processing procedure of the prediction section 15. In this procedure, the prediction section 15 performs a prediction about the value of the voxel of interest using one or more reference voxels (S30), and determines whether or not the predicted value coincides with the value of the voxel of interest (correct prediction) (S32). In a case where it is determined that they match, the held value of the run length counter is incremented by 1 (S34), and the process returns to S30 to process the next voxel of interest.

In a case where it is determined in S32 that the predicted value does not match the value of the voxel of interest, the prediction section 15 outputs a run end signal indicating that the run has ended and a value (run length) indicated by the run length counter to the selection section 18A. In a case where the prediction of the first voxel is missed, the run length output to the selection section 18A is zero.

Then, the prediction section 15 initializes the value of the run length counter to 0 and stands by until the restart instruction is received from the selection section 18A (S39). During the standby, another prediction section 15 may continue to make a correct prediction. In a case where the restart instruction is received from the selection section 18A, the process is restarted from the voxel indicated in the instruction and the process of S30 to S39 is performed.

Returning to the explanation of FIG. 5, the selection section 18A selects information to be passed to the encoding section 20A, from the information input from the N prediction sections 15 and the prediction error calculation section 16.

Figure 7:
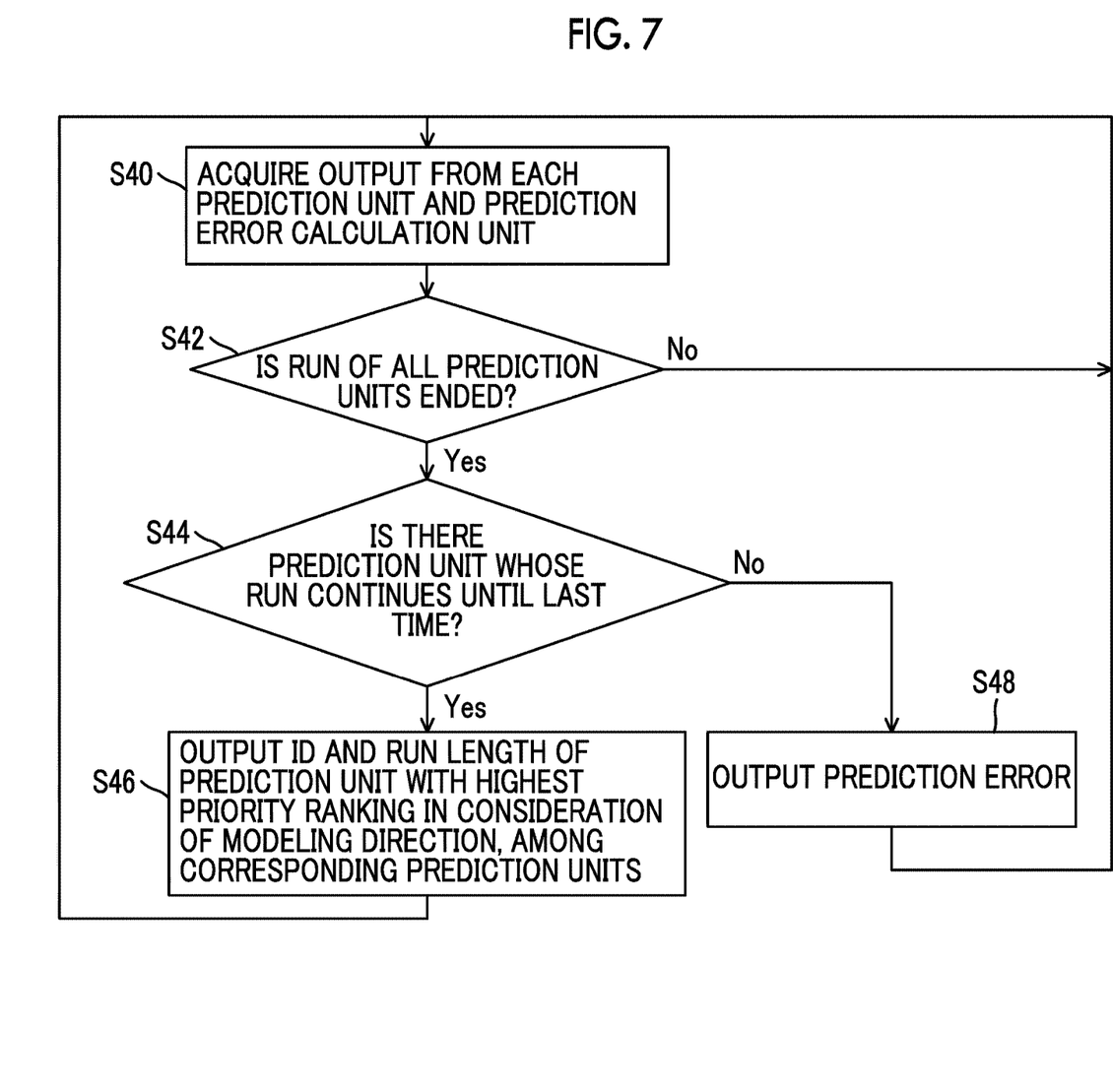
FIG. 7 is a diagram illustrating a processing procedure of a selection section of the apparatus of FIG. 5.

FIG. 7 illustrates the processing procedure of the selection section 18A. In this procedure, each time the selection section 18A acquires the information output from the prediction section 15 and the prediction error calculation section 16 (S40), the selection section 18A determines whether or not the run end signal has been received from all the N prediction sections 15 (S42). In a case where the result of the determination is No, the information on the prediction error received from the prediction error calculation section 16 is discarded, and the process returns to S40 to acquire the output from the prediction section 15 and the prediction error calculation section 16 for the next voxel of interest.

In a case where the determination result in S42 is Yes, the selection section 18A determines whether or not there is a prediction section 15 that makes a run until immediately before (S 44). In a case where all the predictions by the N prediction sections 15 for the voxels of interest immediately after the end of the previous run are missed (that is, in a case where the run lengths of all the prediction sections 15 are 0), the determination result of S44 is No, and in other cases, the determination result is Yes. In a case where the determination result is Yes, the selection section 18A specifies, from among the prediction sections 15 that make a run until immediately before, that is, the prediction sections 15 having the longest run length sent to the selection section 18A along with the run end signal, the prediction section 15 with the highest ranking in consideration of the modeling direction, described above, and outputs the ID and run length of the specified prediction section 15 to the encoding section 20A (S46). In a case where the determination result of S44 is No, the selection section 18A outputs the prediction error received from the prediction error calculation section 16 to the encoding section 20A (S48).

In this manner, the selection section 18A notifies the encoding section 20A of the prediction section 15 with the highest ranking taking the modeling direction into consideration, among the prediction sections 15 that obtain the longest run.

Return to the description of FIG. 5. In a case of receiving the ID and run length of the prediction section 15 from the selection section 18A, similar to the case of the example of FIG. 1, the encoding section 20A converts the ID into the code determined under the rule that the prediction section 15 with a higher ranking in consideration of the modeling direction has a shorter code and outputs the code, and then passes the value of the run length to the output section 22. Further, in a case where the selection section 18A receives the prediction error from the selection section 18A, the selection section 18A passes the value of the prediction error (or the coded version thereof) to the output section 22. The output section 22 outputs the received code data.

By using run length encoding in this way, it is possible to further reduce the code amount.

Note that the decoding apparatus that decodes the data encoded by the encoding apparatus in FIG. 5 executes the inverse process of the encoding apparatus to decode the code data. This mechanism of decoding can be easily inferred from an example or the like in FIG. 4, so that the explanation can be omitted. Since this decoding process may be similar to the procedure shown in FIG. 3 of JP3885413B, refer to JP3885413B if necessary.

In the example described with reference to FIG. 2, only the stacking direction is considered as the modeling direction. On the other hand, in addition to the stacking direction, the in-layer modeling direction may also be taken into consideration.

In the above example, in the point calculation of each prediction section 14 for ranking, an additional point is added in a case where the reference voxel used for prediction by the prediction section 14 is located in the modeling direction with respect to the voxel of interest. In this example, in a case of considering both the stacking direction and the in-layer modeling direction, the points to be added in the point calculation may be different values in the stacking direction and the in-layer modeling direction. For example, since voxel correlation in the stacking direction is stronger (than in other directions) from the way of determining the modeling direction to reduce the number of support materials as much as possible as described above, the number of additional points in the stacking direction is set to a value larger than the number of additional points in the in-layer modeling direction. Thus, the prediction section 14, which uses the reference voxel in the stacking direction with respect to the voxel of interest for prediction, tends to have a high ranking, and then the prediction section 14, which uses the reference voxel in the in-layer modeling direction (for example, the main scanning direction in the layer of the head of the modeling apparatus), tends to have a high ranking.

In the encoding apparatus described above, the coordinate conversion section 12 performs coordinate conversion on the voxel data such that the stacking direction is the Z-axis direction, and then performs predictive encoding. Next, an example of an encoding apparatus not performing coordinate conversion will be described with reference to FIG. 8.

Figure 8:
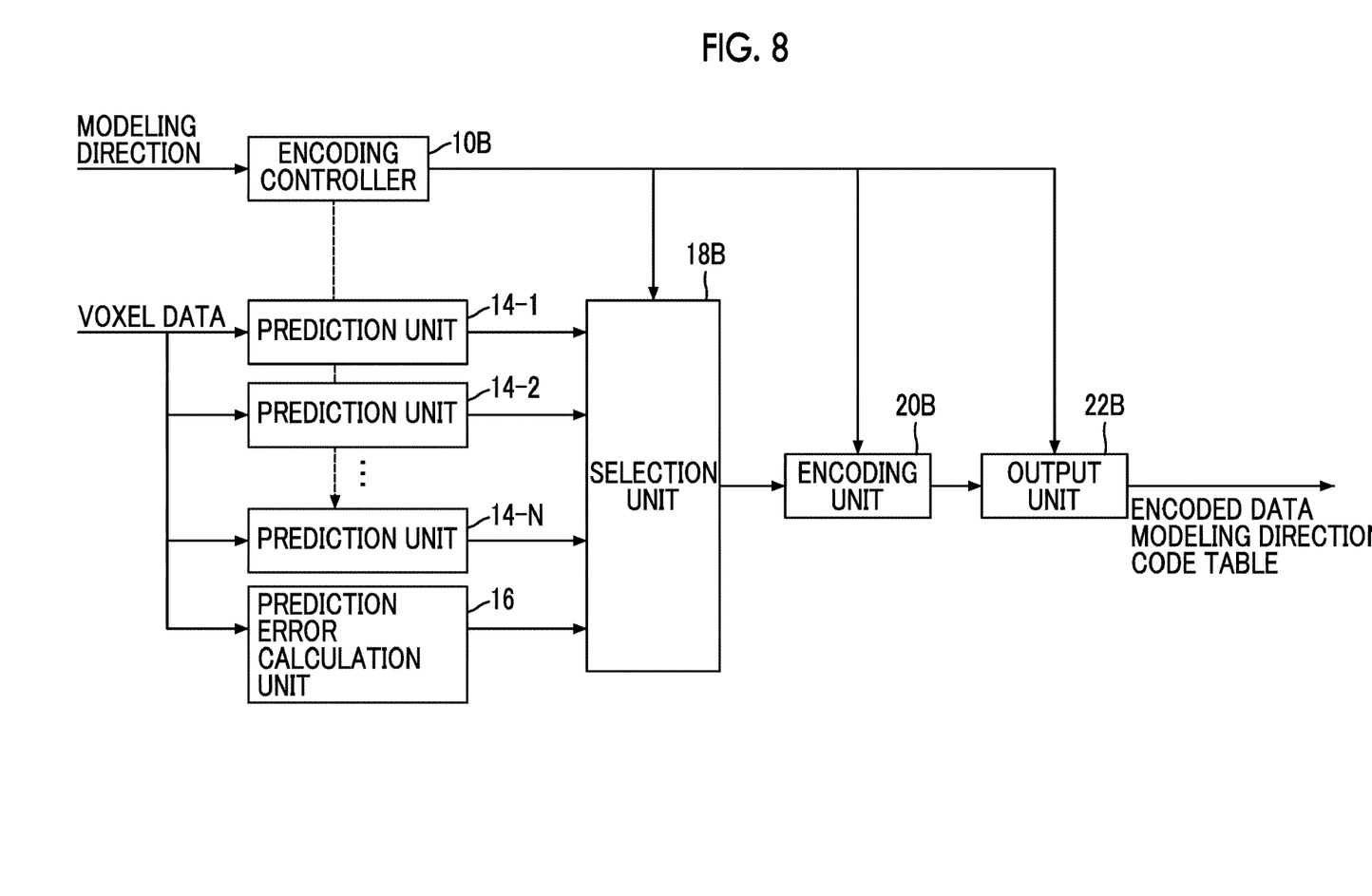
FIG. 8 is a diagram illustrating another functional configuration of an encoding apparatus.

In the encoding apparatus shown in FIG. 8, input voxel data is input to N prediction sections 14 and the prediction error calculation section 16 without being subject to coordinate conversion.

Each prediction section 14 calculates a predicted value of a voxel of interest from the value of the reference voxel around the voxel of interest to be encoded, in the voxel data.

It is to be noted here that in the case of the encoding apparatus of FIG. 1, the direction immediately below the voxel X of interest (the direction of the reference voxel A) shown in FIG. 2 is the modeling direction (in particular, the stacking direction) for the voxel X of interest, but since the coordinate conversion is not performed in the example of FIG. 8, the direction immediately below the voxel X of interest is not necessarily the modeling direction. In other words, in the example of FIG. 1, since the modeling direction of the voxel data input to the prediction section 14 is fixed and known, the ranking of the prediction section can be fixedly determined in advance, from the combination of the reference voxels used by the respective prediction sections 14 for prediction. On the other hand, in the example of FIG. 8, there is a possibility that the modeling direction may be different for each voxel data to be encoded, so it becomes necessary to change the ranking of the prediction section according to the modeling direction.

Therefore, the encoding control section 10B ranks each prediction section 14 by using the information on the input modeling direction. In a case where the modeling direction is known, it can be known whether or not each reference voxel around the voxel X of interest in the coordinate system of the voxel data is located in the modeling direction with respect to the voxel X of interest. Therefore, for each reference voxel, it is possible to determine a point in consideration of a point in view of the modeling direction. For each prediction section 14, the encoding control section 10B may obtain the point of the prediction section 14 from the point of each reference voxel used by the prediction section 14 for prediction, and similarly to the above-described example, the encoding control section 10B may rank the prediction section 14 in order of the point.

In reality, since the modeling direction (for example, the stacking direction) is often selected from the X, Y, Z-axis directions of the coordinate system of the voxel data, the number of modeling directions to be considered is small. The encoding control section 10B may have a ranking table indicating the rankings of N prediction sections 14, for each of these modeling directions, and refer to the ranking table corresponding to a direction to determine the ranking of each prediction section 14, in a case where the modeling direction is input. The encoding control section 10B notifies the selection section 18B and the encoding section 20B of information on the determined ranking of each prediction section 14. Further, the encoding control section 10B determines the allocation of code to each prediction section 14 according to the ranking. For example, a code corresponding to each ranking is set in advance in the encoding control section 10B, and a code corresponding to each prediction section 14 is determined according to the ranking of the prediction section 14. In addition, the code for each ranking which is set in advance in the encoding control section 10B is shorter as the ranking is higher. Thus, the encoding control section 10B generates a code table indicating the correspondence between the identification information of the prediction section 14 and the code. The code table is set in the encoding section 20B.

The selection section 18B receives the information output from the N prediction sections 14 and the prediction error calculation section 16, selects one from among them, and sends the selected information to the encoding section 20B. In this case, in a case where there is plural prediction sections 14 which make a correct prediction, the selection section 18B selects the prediction section 14 with the highest ranking, among the plural prediction sections 14 which make a correct prediction, according to the ranking of the prediction section 14 notified from the encoding control section 10, and outputs the identification information of the prediction section 14 to the encoding section 20B. In a case where all N prediction sections 14 make an incorrect prediction, the selection section 18B outputs the prediction error output by the prediction error calculation section 16 to the encoding section 20B together with information indicating incorrect prediction.

In a case of receiving the identification information of the prediction section 14 with a highest ranking which makes a correct prediction, from the selection section 18B, the encoding section 20B converts the identification information into a code according to the code table set from the encoding control section 10B, and outputs the code. In addition, the process in the case of receiving the prediction error may be the same as in the case of the encoding section 20 in the example of FIG. 1.

The output section 22B outputs the code group received from the encoding section 20B. The output section 22B receives the modeling direction and the code table from the encoding control section 10B, and outputs them in association with the code group. In a case where the code for each ranking is determined between the encoding apparatus and the decoding apparatus, the decoding apparatus can reproduce the code table by the same method as the above-described encoding control section 10B in a case of knowing the modeling direction, so it is not indispensable to output the code table corresponding to the modeling direction each time.

The configuration of the decoding apparatus corresponding to the encoding apparatus may be the same as that shown in FIG. 4. However, the decoding section 30 is configured to decode the code, according to the code table input in association with the code group (or the code table reproduced on the decoding apparatus side based on the input modeling direction). The operations of the selection section 32, each of the prediction sections 34, and the prediction error adding section 36 may be the same as those of the decoding apparatus of FIG. 4. In other words, the selection section 32 selectively operates the prediction section 34 or the prediction error adding section 36 indicated by the decoding result input from the decoding section 30. The prediction section 34 selected from the selection section 32 applies the value of the decoded reference voxel to its prediction expression to calculate the value of the voxel of interest and writes the value as the value of the voxel of interest of the voxel data 38 into the memory area of the voxel data 38.

The decoding apparatus associates the information on the modeling direction received in association with the code data with the voxel data obtained by decoding the code data, and passes the information to the modeling apparatus. In a case of performing modeling based on the voxel data, the modeling apparatus performs modeling according to the stacking direction (and the in-layer modeling direction) indicated by the modeling information.

The encoding apparatus and the decoding apparatus not using the coordinate conversion have been described above. In the above description, similarly to the example of FIG. 1, each prediction section 14 performs prediction with reference to each reference voxel defined in the coordinate system of the voxel data to be encoded, that is, determined with respect to the progress direction of encoding. Then, the encoding control section 10B switches the ranking of each prediction section 14 according to the modeling direction. However, this method is only an example.

Instead, the ranking of each prediction section 14 is fixed, and the encoding control section 10 may inform each prediction section 14 of reference voxels to be applied to the prediction expression by each prediction section 14, according to the input modeling direction. This process may be regarded as performing coordinate conversion of the coordinate system used by the prediction section 14, instead of performing coordinate conversion of the voxel data.

In the case of the method not performing coordinate conversion of the voxel data exemplified in FIG. 8, for example, in a case where the positive direction of the Z axis of the voxel data (that is, the direction in which encoding proceeds in layer sections) and the stacking direction of the modeling direction are opposite or the like, there may be no voxel immediately below the voxel of interest in the stacking direction, among read (or decoded) voxels, in encoding (or decoding). In this case, instead of the immediately below voxel, it may be switched to use the voxel immediately above the voxel of interest in the stacking direction as the reference voxel.

The method of not performing the coordinate conversion of the voxel data illustrated in FIG. 8 can also be applied to the encoding apparatus using the run length method illustrated in FIG. 5 together.

The encoding apparatus and decoding apparatus exemplified above can be configured as a hardware logic circuit in one example. As another example, the encoding apparatus and the decoding apparatus may be realized by, for example, causing a built-in computer to execute a program representing the function of each functional module in each apparatus. Here, the computer has as hardware, a circuit configuration in which for example, a processor such as a CPU, a memory (primary storage) such as a random access memory (RAM) and a read only memory (ROM), an HDD controller controlling a hard disk drive (HDD), a network interface performing control for connection with a network such as various input/output (I/O) interfaces, and a local area network, and the like are connected through, for example, a bus. In addition, a disk drive for reading from and/or writing to a portable disk recording medium such as a CD or a DVD, a memory reader/writer for reading from and/or writing to portable nonvolatile recording medium of various standards such as a flash memory, or the like may be connected to the bus, through for example, I/O interface. A program in which the processing contents of the respective function modules exemplified above are described is stored in a fixed storage device such as a hard disk drive through a recording medium such as a CD or a DVD or through a communication means such as a network, and is installed in a computer. A program stored in a fixed storage device is read into a RAM and executed by a processor such as a CPU to realize the function module group exemplified above. Further, the encoding apparatus and the decoding apparatus may be configured by a combination of software and hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An encoding apparatus comprising:
a processor, configured to:
perform an encoding process comprising encoding voxel data representing a solid to be modeled and determine codes, among a plurality of predictions which predict a value of a voxel of interest based on values of one or more reference voxels around the voxel of interest based on a prediction which makes a correct prediction about the value of the voxel of interest;
acquire a modeling direction, wherein the modeling direction is a direction in which the solid to be modeled grows; and
control the encoding process based on the modeling direction.

2. The encoding apparatus according to claim 1, wherein the processor controls the encoding process such that among the predictions having the same condition other than directions of one or more reference voxels used for prediction with respect to the voxel of interest, a shorter code is assigned to the prediction a higher degree of contribution to prediction of the reference voxel located in the modeling direction with respect to the voxel of interest.

3. The encoding apparatus according to claim 1, wherein in a case where there is a plurality of the prediction sections that make a correct prediction, among the plurality of predictions, the processor controls the encoding process such that a code is determined based on a prediction having a highest degree of contribution to prediction of the reference voxels located in the modeling direction with respect to the voxel of interest, among the predictions that make a correct prediction.

4. The encoding apparatus according to claim 2, wherein in a case where there is a plurality of the prediction that make a correct prediction, among the plurality of predictions, the processor controls the encoding process such that a code is determined based on a prediction having a highest degree of contribution to prediction of the reference voxels located in the modeling direction with respect to the voxel of interest, among the predictions that make a correct prediction.

5. The encoding apparatus according to claim 2, wherein the modeling direction is a stacking direction in which layers constituting the solid are stacked when modeling the solid.

6. The encoding apparatus according to claim 3, wherein the modeling direction is a stacking direction in which layers constituting the solid are stacked when modeling the solid.

7. The encoding apparatus according to claim 4,
wherein the modeling direction is a stacking direction in which layers constituting the solid are stacked when modeling the solid.

8. The encoding apparatus according to claim 5,
wherein in addition to the stacking direction, the modeling direction includes an in-layer modeling direction which is a direction in which modeling of portions constituting the layer proceeds in the same layer, and the reference voxel located in the stacking direction with respect to the voxel of interest is handled with a greater weight in calculating the degree of contribution than the reference voxel located in the in-layer modeling direction with respect to the voxel of interest.

9. The encoding apparatus according to claim 6,
wherein in addition to the stacking direction, the modeling direction includes an in-layer modeling direction which is a direction in which modeling of portions constituting the layer proceeds in the same layer, and the reference voxel located in the stacking direction with respect to the voxel of interest is handled with a greater weight in calculating the degree of contribution than the reference voxel located in the in-layer modeling direction with respect to the voxel of interest.

10. The encoding apparatus according to claim 7,
wherein in addition to the stacking direction, the modeling direction includes an in-layer modeling direction which is a direction in which modeling of portions constituting the layer proceeds in the same layer, and the reference voxel located in the stacking direction with respect to the voxel of interest is handled with a greater weight in calculating the degree of contribution than the reference voxel located in the in-layer modeling direction with respect to the voxel of interest.

11. The encoding apparatus according to claim 1, wherein the processor is further configured to:
perform coordinate conversion on the voxel data such that a direction in which encoding by the encoding process proceeds coincides with the modeling direction,
perform encoding on the voxel data subjected to the coordinate conversion.

12. The encoding apparatus according to claim 2, wherein the processor is further configured to:
perform coordinate conversion on the voxel data such that a direction in which encoding by the encoding process proceeds coincides with the modeling direction,
perform encoding on the voxel data subjected to the coordinate conversion.

13. The encoding apparatus according to claim 3, wherein the processor is further configured to:
perform coordinate conversion on the voxel data such that a direction in which encoding by the encoding process proceeds coincides with the modeling direction,
perform encoding on the voxel data subjected to the coordinate conversion.

14. The encoding apparatus according to claim 4, wherein the processor is further configured to:
perform coordinate conversion on the voxel data such that a direction in which encoding by the encoding process proceeds coincides with the modeling direction,
perform encoding on the voxel data subjected to the coordinate conversion.

15. The encoding apparatus according to claim 5, wherein the processor is further configured to:
perform coordinate conversion on the voxel data such that a direction in which encoding by the encoding process proceeds coincides with the modeling direction,
perform encoding on the voxel data subjected to the coordinate conversion.

16. The encoding apparatus according to claim 6, wherein the processor is further configured to:
perform coordinate conversion on the voxel data such that a direction in which encoding by the encoding process proceeds coincides with the modeling direction,
perform encoding on the voxel data subjected to the coordinate conversion.

17. The encoding apparatus according to claim 1,
wherein the processor informs the encoding process of codes to be assigned to the plurality of predictions respectively, based on a relationship between the direction in which encoding by the encoding process proceeds and the modeling direction.

18. The encoding apparatus according to claim 17, wherein the processor is further configured to:
output a code group corresponding to the voxel data in association with information on the modeling direction.

19. A decoding apparatus comprising:
a processor, configured to:
receive a code group and information on a modeling direction, which are output from an encoding apparatus;
obtain a predicted value of a voxel of interest of each prediction, based on values of one or more voxels around the voxel of interest;
in a case where a code in the received code group corresponds to identification information indicating any one of the predictions, decode the code group, by setting the predicted value indicated by the identification information to the value of the voxel of interest corresponding to the code; and
obtain and set a correspondence between each of the predictions and each code according to the input modeling direction.

20. A non-transitory computer readable medium storing a program causing a computer to:
perform an encoding process comprising encoding voxel data representing a solid to be modeled, and determine a code based on a prediction that makes a correct prediction about a value of a voxel of interest, among a plurality of predictions that predict the value of the voxel of interest, based on values of one or more reference voxels around the voxel of interest;
acquire a modeling direction, wherein the modeling direction is a direction in which the solid to be modeled grows; and
control the encoding process based on the modeling direction.

* * * * *